United States Patent
Rawson, III (10) Patent No.: US 6,874,036 B2
(45) Date of Patent: Mar. 29, 2005

(54) NETWORK MANAGEMENT SERVER COMBINING PDUS TO MINIMIZE BANDWIDTH CONSUMPTION AT DATA LINK LAYER

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 09/779,361

(22) Filed: Feb. 8, 2001

(65) Prior Publication Data

US 2002/0107984 A1 Aug. 8, 2002

(51) Int. Cl.[7] .............................................. G06F 15/16
(52) U.S. Cl. ...................................... 709/246; 709/224
(58) Field of Search ................................. 709/201–203, 709/226–227, 229–249, 223, 246

(56) References Cited

U.S. PATENT DOCUMENTS

| | | | | |
|---|---|---|---|---|
| 5,742,603 A | * | 4/1998 | Shafir et al. ................. | 370/401 |
| 5,905,874 A | * | 5/1999 | Johnson ...................... | 709/250 |
| 6,049,549 A | * | 4/2000 | Ganz et al. .................. | 370/449 |
| 6,075,787 A | * | 6/2000 | Bobeck et al. ............. | 370/395.2 |
| 6,085,238 A | * | 7/2000 | Yuasa et al. ................ | 709/223 |
| 6,085,248 A | * | 7/2000 | Sambamurthy et al. ..... | 709/229 |
| 6,122,667 A | * | 9/2000 | Chung ......................... | 709/228 |
| 6,141,755 A | * | 10/2000 | Dowd et al. ................ | 713/200 |
| 6,151,312 A | * | 11/2000 | Evans et al. ................ | 370/338 |
| 6,397,248 B1 | * | 5/2002 | Iyer ............................ | 709/223 |
| 6,397,287 B1 | * | 5/2002 | Brown et al. ............... | 710/305 |
| 6,510,164 B1 | * | 1/2003 | Ramaswamy et al. ...... | 370/466 |
| 6,516,352 B1 | * | 2/2003 | Booth et al. ................ | 709/250 |
| 6,530,061 B1 | * | 3/2003 | Labatte ....................... | 714/807 |
| 6,564,216 B2 | * | 5/2003 | Waters ......................... | 707/10 |
| 6,570,884 B1 | * | 5/2003 | Connery et al. ............ | 370/419 |
| 6,594,251 B1 | * | 7/2003 | Raissinia et al. ........... | 370/347 |
| 6,650,639 B2 | * | 11/2003 | Doherty et al. ............. | 370/389 |
| 6,675,206 B1 | * | 1/2004 | Britton et al. .............. | 709/220 |
| 6,687,748 B1 | * | 2/2004 | Zhang et al. ............... | 709/223 |
| 6,697,372 B1 | * | 2/2004 | McAlear ..................... | 370/402 |
| 2001/0029474 A1 | * | 10/2001 | Yada | |

OTHER PUBLICATIONS

Yada, "Asset Management system and asset management method".*

* cited by examiner

Primary Examiner—John Follansbee
Assistant Examiner—Haresh Patel
(74) Attorney, Agent, or Firm—Joseph P. Lally; Casimer K. Salys (57) ABSTRACT

A data processing network and an associated method of transmitting protocol data units (PDU) is disclosed. The network includes a first server including a first network interface card (NIC) that connects the first server to a central switch. The network further includes a second server including a second network interface card (NIC) that connects the second server to the central switch. The first NIC is configured to store a first PDU in a buffer upon determining that the first PDU is of a first type and to combine the first PDU stored in the buffer with a second PDU of a second type upon determining that the first and second PDU share a common target. The combined PDU is then forwarded to the common target as a single PDU thereby reducing the number of PDUs traversing the network.

24 Claims, 7 Drawing Sheets

NETWORK MANAGEMENT SERVER COMBINING PDUS TO MINIMIZE BANDWIDTH CONSUMPTION AT DATA LINK LAYER

RELATED APPLICATIONS

The subject matter disclosed in each of the following applications is related: Rawson, Management of servers by polling protocol data units with minimized management traffic at data link layer, copending application Ser. No. 09/779,358, filed Feb. 8, 2001; and Rawson, Prioritization of network management server PDUs versus other PDUs at data link layer, copending application Ser. No. 09/779,362 filed Feb. 8, 2001.

BACKGROUND

1. Field of the Present Invention

The present invention generally relates to the field of data processing networks and more particularly to managing servers in a network using a single physical network while minimizing bandwidth consumption attributable to the management process.

2. History of Related Art

In the field of data processing networks, a local network, such as an Ethernet network, is frequently connected to an external network, such as the Internet, through a router, hub, or other network-dispatching device. The local area network itself may include a significant number of data processing devices or server appliances that are interconnected through a central switch. The server appliances may receive the bulk of their data processing requests from the external network.

When large numbers of server appliances are connected to a common switch and providing critical services such as running web-based applications, they must be managed at minimum cost and with a minimum of additional hardware and cabling. Using a single network for both management and applications is therefore desirable. Unfortunately, using a common network with limited bandwidth for application and data traffic as well as management traffic may result in decreased application performance. It is therefore desirable to reduce the overhead associated with management tasks in a network environment. It is further desirable if the implemented solution is compatible, to the greatest extent possible, with existing network protocols to minimize time and expense.

In addition, traditional networks typically require the periodic gathering of management information. This periodic information retrieval has generally been inefficiently achieved by configuring an alarm and programming one or more processors to respond to the alarm by sending management information on the network. Typically, this polled information travels over the network using the same logical path (same communication protocol) as the application packets thereby resulting in unnecessary delays and complexity due to the nature of communication protocols and the inherent operation of the local area network. It would desirable to improve upon the efficiency with which this periodically information retrieval is handled. Moreover, traditional networks have typically not implemented methods to prioritize packets efficiently despite the advent of protocol standards that explicitly define prioritization resources. It would be desirable to use such resources to provide a method of beneficially differentiating different types of packets from one another and implementing transmission and interrupt priorities based on such differences.

SUMMARY OF THE INVENTION

In another embodiment, a NIC of the first server is configured to send a low level polling request to the second server NIC and the second server NIC is configured to respond to the polling request with a low level transfer of the buffered information to the first server NIC. The first server may comprise a dedicated management server and the second server may comprise a server appliance configured to receive processing requests from an external network. The network may include a plurality of additional server appliances, each attached to the central switch, where the management server is configured to manage each of the server appliances. The first server NIC may be configured to broadcast the polling request to each of the server appliances on the network. The first server NIC may be configured to send the polling request in response to the expiration of a timer.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 1:
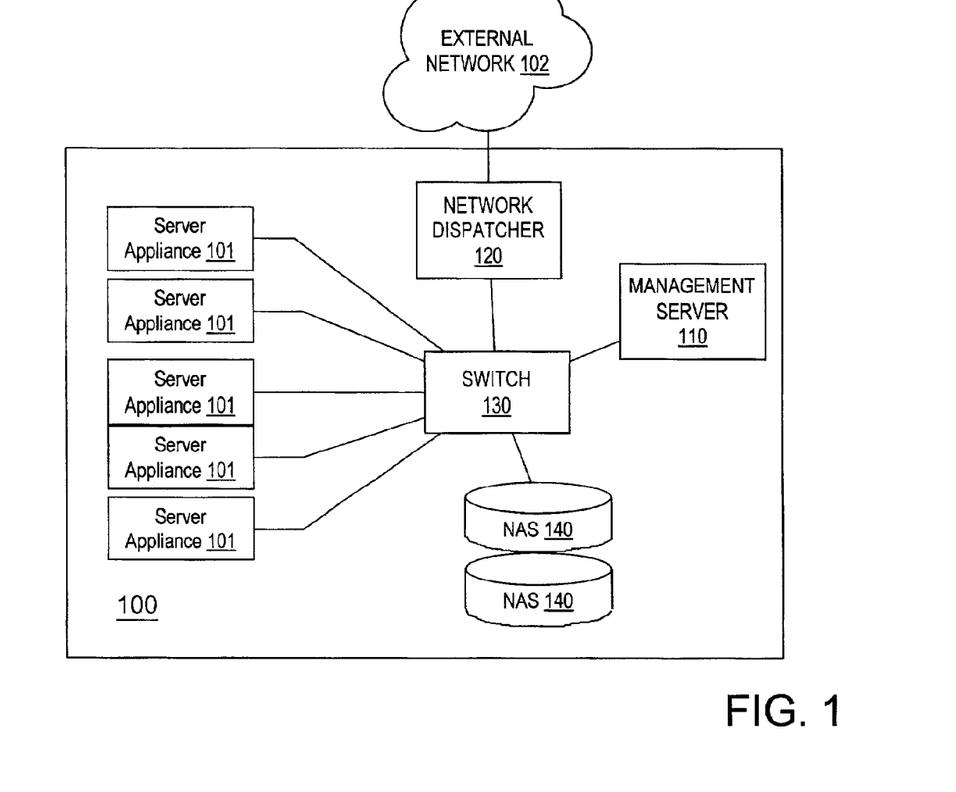
FIG. 1 is a block diagram of selected elements of a data processing network according to an embodiment of the present invention.

Turning now to the drawings, FIG. 1 illustrates selected features of a data processing network 100 according to one embodiment of the present invention. In the depicted embodiment, network 100 includes a set of servers, referred to herein as server appliance(s) 101, that are connected to a central switch 130. Switch 130 is connected to an external network 102. The external network 102 may represent the Internet for an application in which network 100 is providing web-based services. A network-dispatching device 120 is used to control the flow of incoming work from external network 120.

Figure 2:
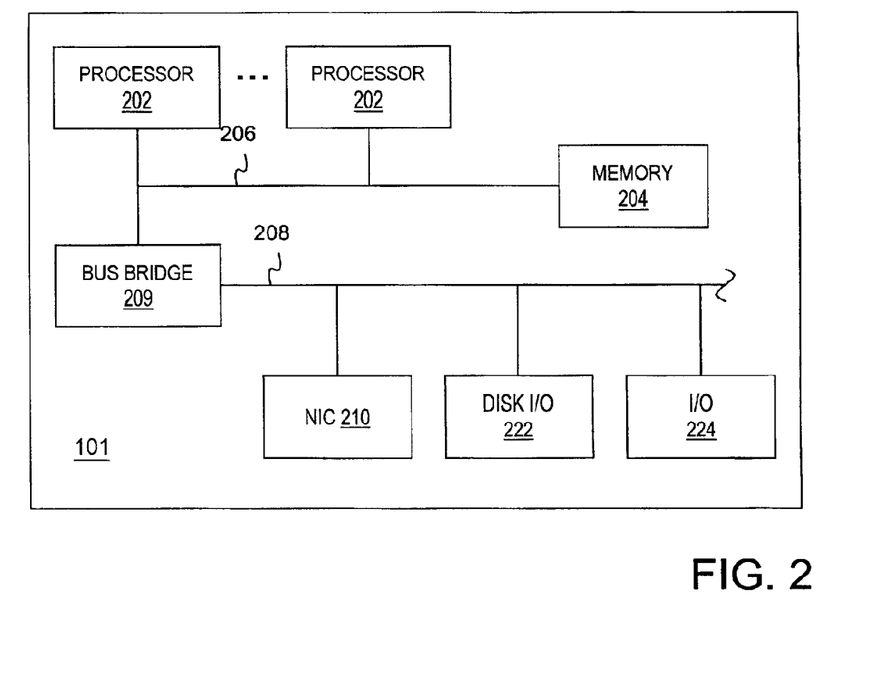
FIG. 2 is a block diagram of selected elements of an exemplary server appliance suitable for use in the data processing network of FIG. 1.

Referring to FIG. 2, a block diagram of a typical server appliance 101 is presented. In the depicted embodiment, server appliance 101 includes one or more processors 202 that are connected to a memory 204 via a processor bus 206. A bus bridge 209 connects an I/O bus 208 to processor bus 206. A network interface card (NIC) 210 connected to I/O bus 208 enables server appliance 208 to connect to and communicate with central switch 130. I/O bus 208 may comply with any of a variety of legacy I/O protocols such as PCI and PCI-X. Alternatively, server appliance 101 may support emerging I/O subsystem architectures such as the InfiniBand™ architecture developed by the InfiniBand Trade Association. The InfiniBand architecture uses channel based point-to-point connections rather than the shared bus, load-and-store configuration of PCI and its predecessors. Server appliances 101 may be implemented with a streamlined set of hardware and may be distinguished from traditional servers by the lack of various components typically found in conventional server boxes such as hard disks and graphics cards.

Returning now to FIG. 1, the depicted embodiment of network 100 further includes permanent mass storage identified as network attached storage (NAS) 140. NAS 140 is a well-known type of device that typically includes a network interface connected to multiple disk drives. The network interface of NAS 140 may export a file system that enables the network servers to access data. The F700 and F800 series of filer boxers from Network Appliance, Inc. are examples of devices suitable for use as NAS 140.

Network 100 may further include a management server 110 connected to central switch 130. As its name, implies, management server 110 is a dedicated server responsible for managing network 100 (including server appliances 101 and NAS 140). For purposes of this disclosure, typical management tasks include tasks associated with the deployment and configuration of server appliances 101, the installation of software and hardware upgrades, monitoring and managing network performance, security, failures, and storage capacity, and other statistical gathering and analysis tasks.

Theoretically, each server appliance 101 may operate with its own execution environment. More specifically, each server appliance 101 may have its own instance of the operating system (OS), network communication protocol, and hardware layer. In a typical web based server environment, each layer of the communication protocol may add its own header or trailer with information, including destination address information, that is determined by the layer's specification. Perhaps the most commonly encountered communication protocol is the transmission control protocol/internet protocol (TCP/IP) suite of protocols, which provide the foundation and framework for many computer networks including the Internet. TCP/IP is extensively documented in a variety of publications including M. Murhammer et al., *TCP/IP Tutorial and Technical Overview*, available online at www.redbooks.ibm.com (#GG24-3376-05) and incorporated by reference herein. In a TCP/IP network, a TCP header and an IP header are pre-pended to a packet as the packet moves down the protocol stack. A media access control (MAC) header is typically pre-pended to each packet before the packet reaches the physical layer (i.e., the network hardware). The MAC header includes the network address of the target device. Because each device in network 100 is directly connected to switch 130, each device has a unique MAC address. The NIC 210 of each server appliance 101, for example, has a unique MAC address. Thus, NIC 310 can determine the target of a packet from the packet's MAC address.

From the perspective of providing web-based services to multiple customers, multiple execution environments may be desirable to implement one or more applications. From the perspective of managing network 100, however, a multiplicity of server appliances is difficult to accommodate. If the number of server appliances is significant (more than approximately five), administering each appliance server 101 separately is cumbersome, inefficient, and time consuming.

Network 100 addresses the overhead associated with managing a heterogeneous set of server appliances by providing a dedicated management server 110 that presents a single system image for network management purposes. Using a conventional web browser to access this single image, management of each of the server appliances can be accomplished from a single point. In one embodiment, management server 110 includes a server appliance manager that communicates directly with each server appliance 101. The server appliance manager generates code in a neutral language, such as extended markup language (XML), that is communicated to an agent associated with and customized for an organization management system (OMS). The OMS converts the XML code to a format suitable for use with each OMS. In this manner, a web-based application provider can lease specific server appliances 101 to various organizations and allow each organization to manage its own leased appliance, using its own OMS, through a common server.

As indicated in FIG. 1, management server 110 is locally connected to each server appliance 101 and to NAS 140 through switch 130. In this embodiment, management information traveling to and from management server 110 travels over the same physical network as application and data packets. This design is contrasted with a conventional design in which management information may be transmitted over a physically distinct medium such as a serial bus that connects service processors of each network device. While sharing a common medium simplifies the design of network 100, it necessitates the sharing of finite network bandwidth between application packets and management information. For purposes of this disclosure, the term protocol data unit (PDU) is used generally to identify packets or frames and a distinction is made between management PDUs and application PDUs. Since the purpose of network 100 is to provide application services, it is highly undesirable if significant bandwidth is required to transmit "non-application" PDUs, i.e., management PDUs. Thus, one embodiment of the present invention contemplates minimizing management PDU bandwidth consumption.

Network 100 is preferably implemented with a high bandwidth network such as Gigabit Ethernet as specified in IEEE 802.3, which is incorporated by reference herein. Gigabit Ethernet supports the use of traditional PDU sizes of 1460 octets (bytes) as well as the use of jumbo PDU sizes of 9022 octets. In many applications, it may be reasonable to assume that the size of at least some PDUs transmitted over the network is less than the maximum transmission unit (MTU), especially for networks that support jumbo PDUs. A PDU that is smaller than the MTU is referred to herein as an eligible PDU.

One embodiment of the present invention contemplates minimizing the bandwidth consumed by management PDUs by using available space in eligible application PDUs to "piggy back" management information into an existing PDU upon determining that the management PDU and the application PDU share a common network destination or target. By using a single PDU to transmit both management information and application information, the number of PDUs is transmitted over the network is reduced. Since PDUs must be separated from each other by transmission gaps that represent wasted bandwidth, performance is maximized by transmitting fewer and larger PDUs.

Figure 3:
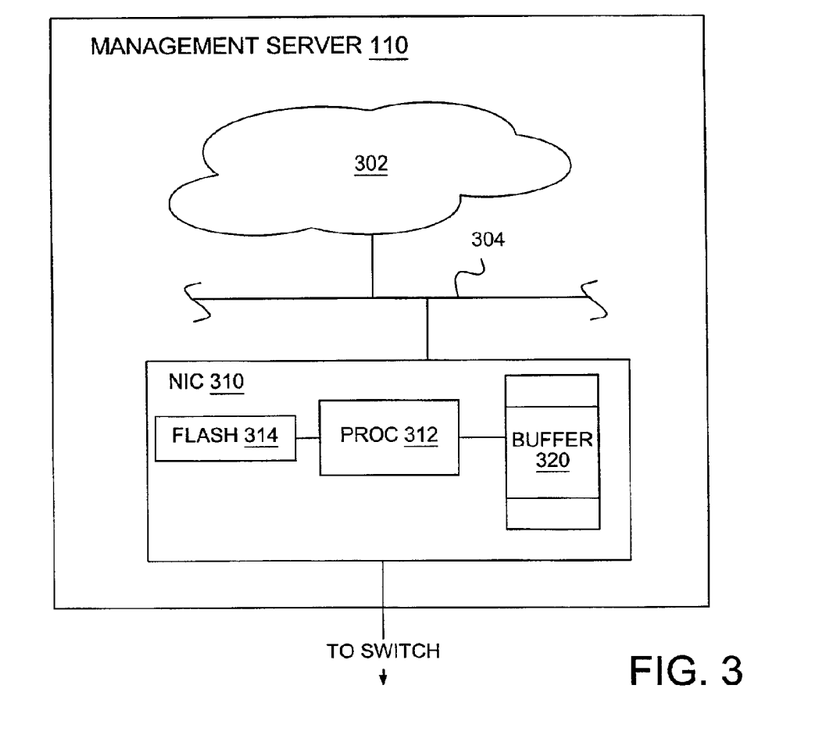
FIG. 3 is a block diagram of selected features emphasizing the network interface card of a management server suitable for use in the data processing network of FIG. 1.

Turning now to FIG. 3, a block diagram of management server 110 is depicted to illustrate selected features of the server according to one embodiment the invention. Management server 110 has a core 302 that includes one or more processors, a memory connected to the processor(s) via a processor/memory bus, and a bus bridge that connects an I/O bus to the processor memory bus. The management server core architecture may be equivalent or substantially similar to the architecture of the exemplary server appliance 101 depicted in and described with respect to FIG. 2. The core 302 of management server 110 provides an I/O bus 304 to which a network interface card (NIC) 310 is connected. NIC 310 enables communication between management server 110 and network switch 130 (not depicted in FIG. 3).

NIC 310 typically includes its own processor 312, a non-volatile storage device such as a flash memory 314, and a dynamic storage facility (RAM) identified as buffer 320. NIC 310 may further include sufficient scratch memory (not depicted) to modify PDUs as described below. Flash memory 314 includes one or more programs, each comprising a sequence of instructions executable by processor 312, for controlling the transfer of information (PDUs) between management processor 110 and switch 130. The architectural features of NIC 310 may also be found on the network interface cards 210 of each of the server appliances 101.

Management server 110 sends management PDUs to and receives management PDUs from server appliances 101. As discussed above, the management PDUs are generally related to the gathering and logging of various statistical information concerning network operation. In addition, however, management server 110 may transmit "non-management" or application PDUs such as file system information and software downloads to server appliances 101. Thus, management server 110 may send both management PDUs and application PDUs to other network devices through central switch 130. Similarly, server appliances 101 may send management PDUs to management server 110 (presumably in response to a management PDU received from server 110) as well as application PDUs.

Figure 4A:
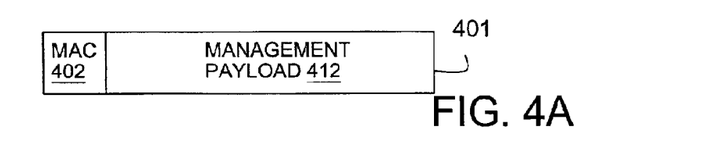
FIGS. 4A, 4B, and 4C are conceptual representations of a management protocol data unit, an application protocol data unit, and a combined protocol data unit respectively according to one embodiment of the invention.

Management PDUs typically comprise low-level data units transmitted between management server 110 and one or more device(s) that are locally connected on network 100. Management PDUs may travel between NIC 310 and the core 302 of management server 110 over different logical paths. Whereas application PDUs must typically flow through an entire protocol stack, management PDUs are typically generated at the lowest levels of a stack. Using the example of web based services running on a TCP/IP network, application PDUs are formatted to be TCP/IP compliant whereas management PDUs may have just a single header, such as a MAC header. FIG. 4A illustrates an example of such a management PDU 401. As illustrated, management PDU 401 includes a management payload 412 and a MAC header 402 specifying the physical address of the PDUs target. Because management PDUs are destined for local targets, they do not require the Internet address and other information provided by the higher levels of the protocol stack.

Figure 4B:
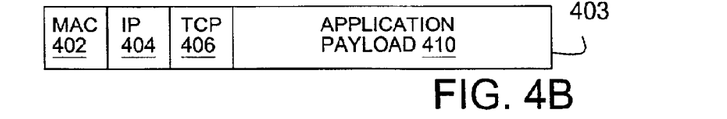

Processor 312 of NIC 310 is configured to detect PDUs generated by management server 110. Upon detecting a PDU, processor 312 may initially determine whether the PDU is a management PDU or an application PDU. An illustrative application PDU 403 is depicted in FIG. 4B. In this example, application PDU 403 includes an application payload 410 and a TCP/IP compatible header structure including a TCP header 406, an IP header 404, and a MAC header 402. If the PDU is a management PDU, processor 312 may then determine whether there is an entry available in buffer 320 and store the management PDU in buffer 320 if there is an available entry. If there is no available entry in buffer 320, processor 312 may simply forward the management PDU to switch 130 without modification. Each management PDU typically includes payload information and a MAC header including a MAC address as discussed above indicating the server appliance or other device on network 100 to which the PDU is destined. Buffer 320 may be organized in a cache fashion where a PDUs MAC address is used as an index into buffer 320. In this embodiment, management PDUs are assigned entries in buffer 320 according to their MAC address. This arrangement may simplify the task of later determining if buffer 320 contains a PDU destined for a specific device. Alternatively, buffer 320 may comprise a random access memory in which a PDU associated with any target may be stored in any of the buffer entries.

In addition to the MAC address, the MAC header of a management PDU may include an indication of the size of the PDU payload. As the payload size of a management PDU approaches the MTU of the network, the likelihood of combining the PDU with another PDU diminishes. One embodiment of the invention compares the size of an eligible management PDU to a maximum PDU size. If the size of the management PDU is greater than or equal to the maximum size, the management PDU is fragmented if necessary and forwarded to switch 130 without delay. If the management PDU is smaller than the maximum PDU size, NIC 310 will attempt to save the PDU and combine it later with another PDU destined for the same network address.

If processor 312 determines that a particular PDU is an application PDU, the processor may first determine whether the application PDU is an eligible application PDU (i.e., an application PDU with a size less than some predetermined maximum). If processor 312 determines that a particular application PDU generated by management server 110 is an eligible application PDU, processor 312 may then determine whether any management PDUs with the same target address are pending in buffer 320. As discussed previously, buffer 320 may be organized where the network address provides an index into buffer 320. In this embodiment, determining whether there is an eligible management PDU suitable for combining with an eligible application PDU is accomplished by determining whether an entry in buffer 320 corresponding to the application PDU's target address contains a valid management PDU. In any event, if NIC 320 detects a match between an eligible application PDU's target address and the target address of a management PDU pending in buffer 320, NIC 310 is configured to modify the eligible application PDU to include the payload of the management PDU.

Figure 4C:
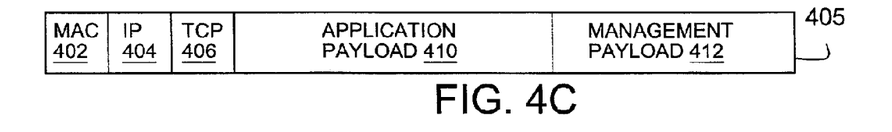

Referring to FIG. 4C, a conceptualized depiction of a hybrid or modified PDU 405 modified by NIC 310 according to the present invention is illustrated. Modified PDU 405 typically includes a set of headers such as a MAC header 402, an IP header 404, and a TCP header 406 similar to application PDU 403. In addition, however, modified PDU 405 may include a payload comprised of an application PDU payload 410 and a management PDU payload 412. Typically, one or more of the PDU headers includes information indicating the size of the payload. In an embodiment of the invention in which management payload 412 is appended to PDU 405 at a low-level of the protocol stack, the payload size information in MAC header 402 reflects the combined size of data payload 410 and management payload 412. For purposes of this disclosure, the low-levels of a protocol stack include the physical and data link layers as described in the Open Systems Interconnect (OSI) Reference Model developed by the Internal Standards Organization. The physical and data link layers provide the transmission media and protocols for local communications. In contrast, the headers generated at higher levels in the protocol stack reflect only the size of data payload 410. Because headers such as IP header 404 and TCP header 406 are unaffected by the inclusion of management PDU information into an application PDU, the present invention is TCP/IP compatible. In other words, modification of an existing protocol stack at only the lowest level is required to implement the invention. By confining the modifications required to implement the invention to the lowest levels of the protocol stack, the present invention is easily implemented and is compatible with standard TCP/IP networks.

When a combined PDU such as modified PDU 405 is transmitted to a server appliance 101 or other target on network 100, the NIC in the target device is configured to disassemble the combined PDU information into its component parts. More specifically with respect to the implementation discussed above, the target device NIC, such as the NIC 210 in each server appliance 101, is configured to strip off the management information from a modified PDU by comparing the PDU size information in MAC header 402 to the PDU size information contained in other headers such as TCP header 406 or IP header 404. The difference between the PDU size information in MAC header 402 and the PDU size information in the other headers represents the size of the management PDU payload that was appended to the PDU by NIC 310 of management server 110.

The data link layer of each server appliance 101 is preferably configured to modify incoming PDUs that include both a management PDU payload as well as an application PDU payload. Typically, NIC 210 modifies the received PDU by storing the management payload in a buffer (not depicted) and reconfiguring the PDU by stripping of the management payload and the MAC header. After this modification is complete, the PDU comprises a standard TCP/IP PDU with a single payload. This modified PDU can then be processed up the protocol stack in the conventional manner to retrieve the appropriate payload.

The NIC 210 of each server appliance 101 may be configured similarly to the NIC 310 of management server 110. More specifically, each NIC 210 may include a buffer and a processor configured to store eligible management PDUs in the buffer until an eligible application PDU with the same destination address is detected. In an embodiment in which network management is centralized in a single, dedicated server such as management server 110, the destination address of each eligible management PDU generated by servers 101 is typically the management server 110. Thus, the buffer of each NIC 210 may be considerably simpler than the buffer 320 of management server NIC 310 (which has to allocate entries for each network address and keep track of the destination address). When a server appliance 101 generates an application PDU targeted for management server 110, NIC 210 will determine if any management PDUs are pending in the NIC's buffer. NIC 210 will then attempt to generate a combined PDU similar to PDU 405 if there is a management PDU pending in its buffer. In the described manner, the present invention attempts to take advantage of the larger PDU sizes available on high bandwidth networks by maximizing the information that is carried in each PDU and reducing the size of each PDU.

Figure 5:
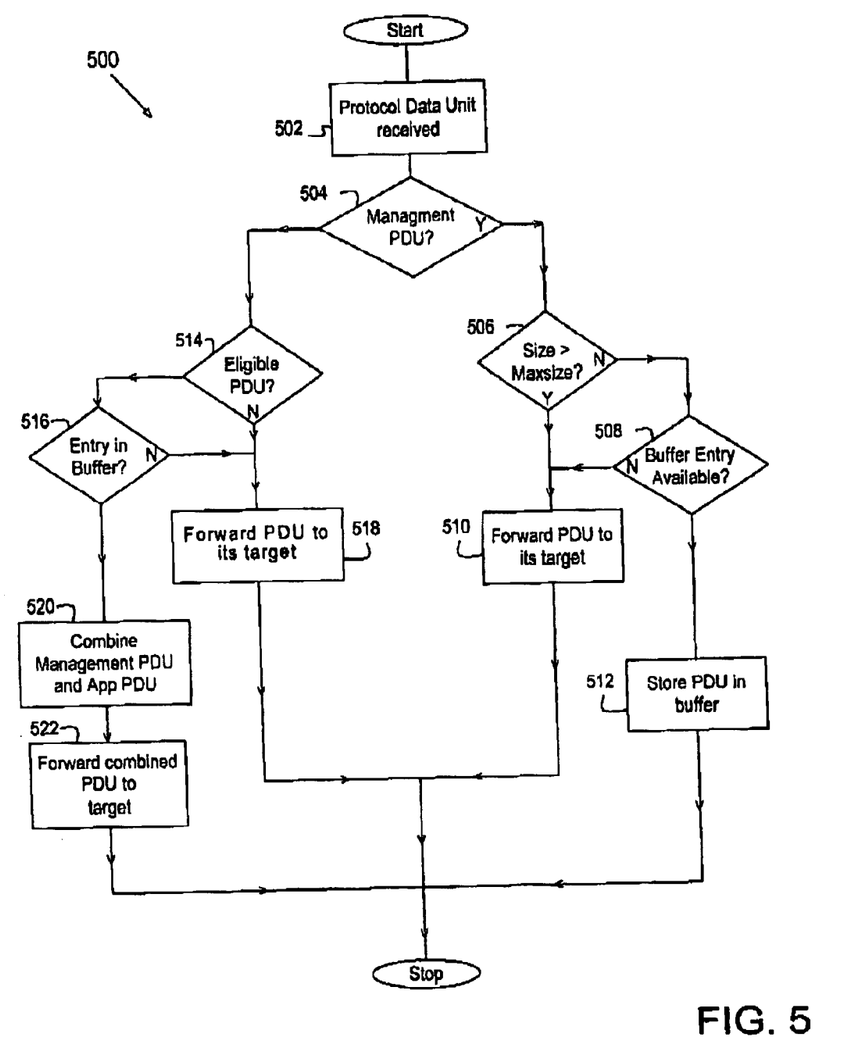
FIG. 5 is a flow diagram illustrating a method of combining management and application information to optimize bandwidth consumption in a data processing network according to one embodiment of the invention.

Turning now to FIG. 5, a flow chart illustrating a method 500 of transferring information among servers in a computer network such as computer network 100 is depicted. Initially, a PDU generated by a server is detected (block 502) by the server's network interface card. The server may be the management server 110 depicted in FIG. 1. Upon detecting a PDU, the server's NIC then determines whether the PDU is a management PDU (block 504). If a management PDU is detected, the NIC may compare (block 506) the size of the PDU to a predetermined maximum size. If the PDU size is greater than or equal to the maximum predetermined size, the PDU is considered to be too large to be combined with a non-management PDU and the management PDU is therefore simply forwarded (block 510) to its network target. If the size of the management PDU is less than the maximum predetermined size, the NIC determines if there is an available entry in a management PDU buffer such as buffer 320 depicted in FIG. 3. In one embodiment, determining whether an entry in the NIC buffer is available includes indexing the buffer using the network target's MAC address, which comprises a portion of the PDU's MAC header.

If the NIC determines that there is no entry available in buffer 320, the packet is forwarded to its network target in block 510. If, however, there is an available entry in the NIC's buffer and the size of the PDU is less than the maximum predetermined size, the management PDU is stored (block 512) in the NIC buffer where it will await combination with a future non-management PDU destined for the same network target as the management PDU.

If the NIC determines in block 504 that a PDU is an application PDU and not a management PDU, it then determines (block 514) whether the size of the PDU is less than the MTU of the network (i.e., whether the PDU is an eligible application PDU). If the data PDU is not an eligible PDU, the application PDU is simply forwarded to its target over the network in block 518. If the application PDU is an eligible PDU, the NIC determines (block 516) whether there is a management PDU currently stored in the NIC's buffer that has the same target address as the application PDU. If there is no such management PDU in the buffer, the application PDU is forwarded to its target in block 518. If, however, a valid management PDU in the NIC's buffer is found to have the same target address as the application PDU, the NIC generates (block 520) a combined or hybrid PDU by incorporating the management PDU payload into the application PDU.

In one embodiment, the generation of the hybrid PDU may include determining whether the available space in the application PDU is sufficient to accommodate the management PDU that is stored in the buffer. The available space in the application PDU is generally the difference between the MTU and the size of the application PDU. If the size of the management PDU payload is less than this difference, then the entire management payload may be incorporated into the hybrid PDU. If the management PDU payload is larger than the available space in the application PDU, the application PDU may be forwarded without combination. Typically, the generation of the hybrid PDU includes modifying the MAC header of the application PDU to reflect the increased size of the hybrid payload (i.e., the combination of the application PDU payload and the management PDU payload). Once the hybrid PDU is constructed in block 520, it is sent to the target device in block 520.

Typically, each server appliance 101 includes a NIC roughly analogous in architectural design to the NIC 310 of management server 110. When a server appliance NIC receives a PDU from the network, it may first determine whether the PDU originated from management server 110. If an incoming PDU came from management server 110, the appliance server NIC may determine whether the PDU is a hybrid PDU by comparing the payload size indicated by the MAC header with the payload size indicated by one or more of the other headers including the TCP header and/or the IP header. When an appliance server NIC discovers a hybrid PDU, it may first strip off the management payload from the packet (again based on payload size difference information in the PDU headers). It can then process the management information separately from the application information as appropriate.

When an appliance server 101 returns management information to management server 110 such as in response to a management server request, the process described above may be substantially reversed. More specifically, the appliance server NIC may include a buffer used to store management PDUs. If a management PDU meets predetermined size criteria, the appliance server NIC may store the management PDU in its buffer. When the appliance server eventually generates an application PDU with the management server 110 as a target, the server appliance NIC may attempt to combine a buffered management PDU with the application PDU prior to sending the PDU back to the management server. In this manner, one embodiment of the invention reduces bandwidth consumption attributable to management PDUs.

Figure 6:
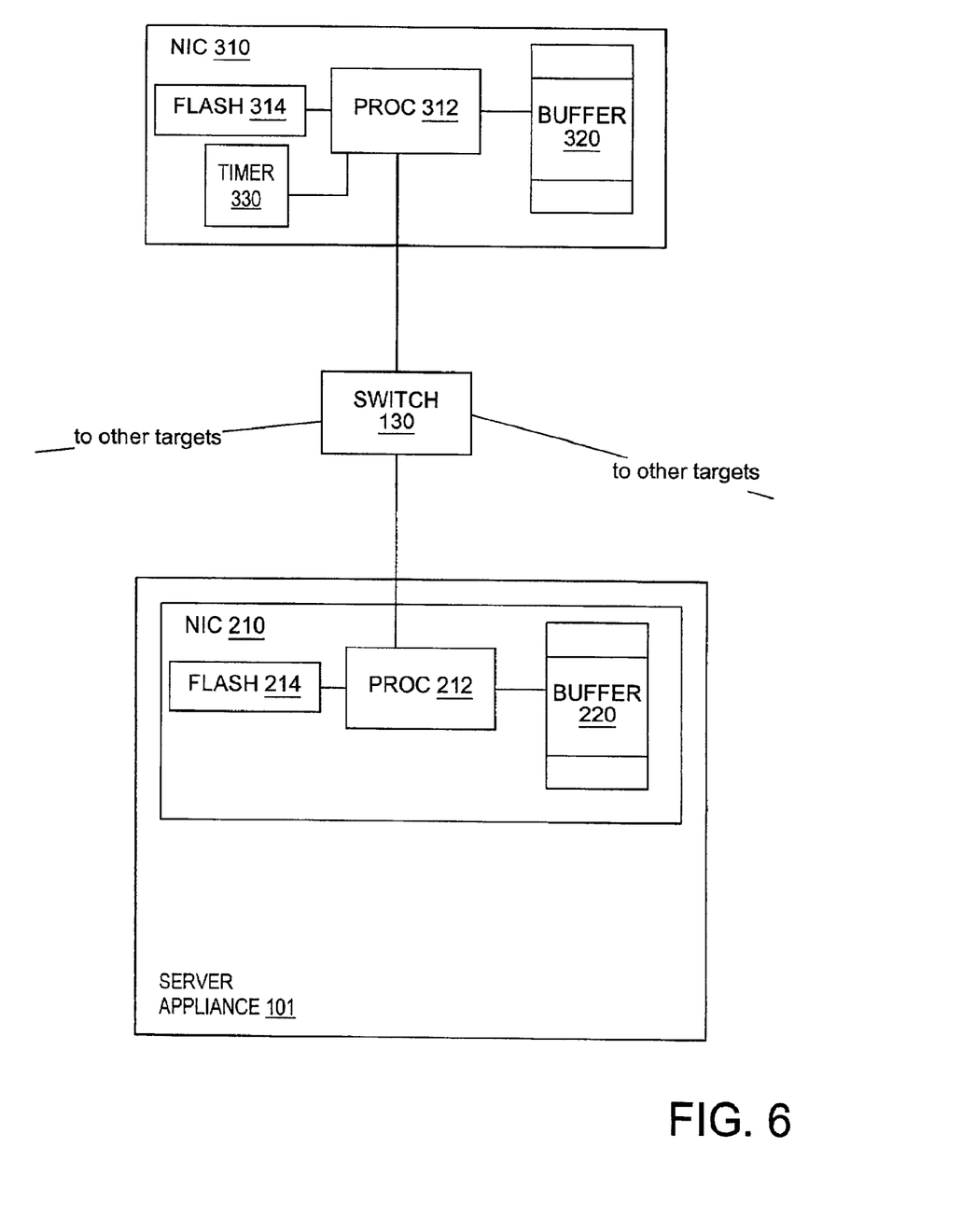
FIG. 6 is a block diagram illustrating selected features of network interface cards suitable for use in an embodiment of the invention that includes automated, low-level polling to gather management information.
Figure 7:
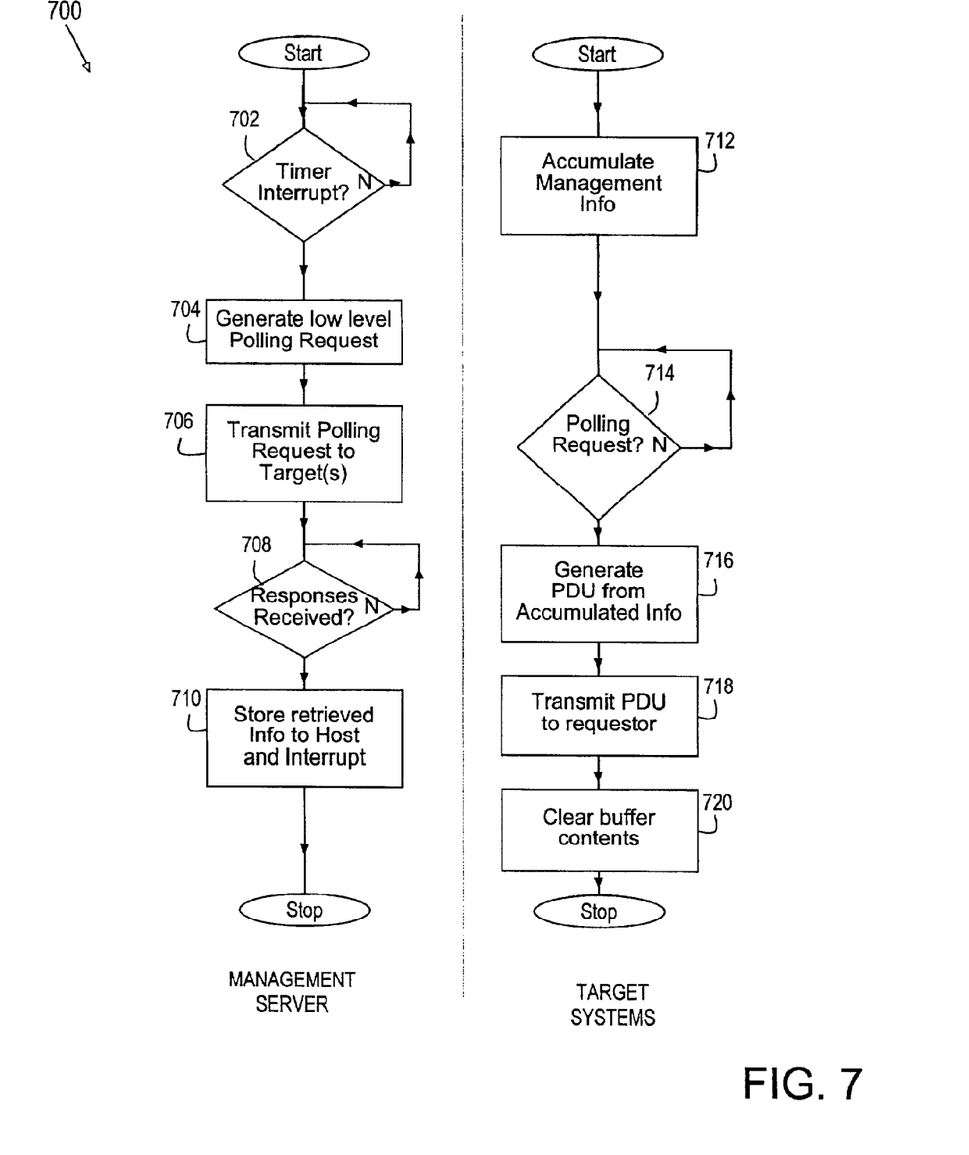
FIG. 7 are flow diagrams illustrating the operation of an automated, low-level polling embodiment of the invention.

Turning now to FIG. 6 and FIG. 7, selected features of network 100 are presented to illustrate an embodiment of the invention configured to simplify and automate the periodic gathering of management information on network 100. Historically in network environments, gathering of management information is accomplished by programming each host processor to set an alarm. When the alarm activated, management information is transmitted in the same manner as application packets are transmitted (i.e., using the application PDU protocol stack). Unfortunately, such an implementation results in overhead that is subject to numerous delays due to the nature of protocol stacks and the behavior of Ethernet and other networks.

One embodiment of the present invention addresses this problem by providing a system and method for automatically gathering management information on a data processing network. Generally speaking, the invention provides a low-level, timed packet polling scheme that leverages the programmability and typically substantial storage capacity of the network interface cards of each device on the network. Typically, the management information under consideration is well defined and available either locally at the NIC or capable of being written directly to the NIC by the corresponding host processor. This information is then accumulated in a dedicated buffer on the NIC. Periodically, a locally attached system or device (i.e., a system or device that is on the same sub-net) issues a low-level request for management information. The request may be sent to a specific device or globally to each of the devices on the local network. Each system targeted by the information request responds by transmitting a PDU containing the contents of the buffer back to the address associated with the information request and clearing the buffer.

In an embodiment illustrated in FIG. 6, the network device assigned responsibility for issuing the periodic information requests is the NIC 310 of the dedicated management server 110 discussed above with respect to FIG. 1. In this embodiment, NIC 310 may include a timer 330 that is connected to processor 312. Timer 330 may be programmed with a predetermined time interval depending upon the frequency at which the management information is to be gathered. When the predetermined interval expires, timer 330 may interrupt processor 312 to initiate the request for information. In response to such an interrupt from timer 330, processor 312 generates and issues a low-level polling request (i.e., a request issued at the data link layer). In one embodiment, for example, the polling request issued by processor 312 includes a data link layer header, including a MAC header, that includes the network address of one or more target devices, but does not include additional protocol headers such as the network and transport layer headers. Since management server 110 and each of the server appliances 101 comprise a portion of a single LAN, the data link layer is sufficient to uniquely identify the network address. In this embodiment, the format of the polling request is similar to the format of the PDU 401 depicted in FIG. 4A.

The NIC 210 of each target device on network 100 that receives the polling request from NIC 310 includes a processor 212 connected to a storage device such as buffer 220. In this embodiment, the buffer 220 may be dedicated for the storage of the management information. As management information is generated by each NIC 210 or received by each NIC 210 from its corresponding host processor (not depicted), the information is stored in buffer 220. Upon receiving the polling request PDU, each processor 212 responds by generating a responsive PDU that includes the network address of the device that issued the polling request (i.e., the address of NIC 310) and all or a portion of the information stored in buffer 220. These PDUs are then delivered to NIC 310 via switch 130.

When NIC 310 receives responses from all of the devices targeted by the polling request, the management information contained in each of the responsive PDUs may be copied to a predetermined area of host storage. NIC 310 may then interrupt its host processor where further processing of the management information can be performed. By substantially delegating the generation of the polling requests to NIC 310, this embodiment of the invention beneficially enables the host processor of management server 110 to concentrate on other tasks such as the analysis and display of the management information. In addition, the use of low level PDUs that are not required to travel up and down entire protocol stacks results in the efficient gathering of management information on a periodic basis.

FIG. 7 is a pair of flow charts illustrating a method 700 for the automated polling of information in a data processing network such as network 100. The flow chart on the left side of FIG. 7 represents operation of the management server 110 while the flow chart on the right represents the operation of each of the systems targeted by the polling request. These targeted devices may represent the server appliances 101 as depicted in FIG. 1. Initially, management server 110 and the target systems are in an operational mode. Upon detecting an interrupt from a timer (block 702), management server 110 generates (block 704) a polling request which is preferably a low-level request as described above. This polling request may actually represent a distinct polling request for each targeted system or, more preferably, a single polling request that is globally broadcast to each system that is locally attached to management server 110 (i.e., attached directly to central switch 130). After the polling request is generated, management server 110 then transmits (block 706) the request to the targeted devices and enters a loop in which it awaits responses from each of the targeted devices.

Simultaneously with the operation of management server 110, the targeted systems are in an operational mode. As part of this operational mode, the targeted devices are accumulating (block 712) management information in a special purpose buffer. When a polling request from management server 110 is detected (block 714), each targeted system generates (block 716) a PDU that is responsive to the polling request. More specifically, the responsive PDU generated by each targeted system is a low-level PDU that includes a header containing the destination address of the requesting device (typically the management server 110) and a payload including at least part of the accumulated management information. After generating the responsive PDU, each targeted device then transmits (block 718) the PDU back to the requestor and clears (block 720) the accumulated information from its buffer.

After sending the polling request in block 706, the management server waits until responses are received from each of the targeted systems. Upon determining (block 708) that responses have been received from each targeted system, the management server can then store (block 710) the retrieved information to its host system's memory and interrupt the host. The management server host may then process the retrieved information as needed. In the preferred embodiment, each of the blocks illustrated on the management server side of FIG. 7 is preferably delegated to the management server's NIC 310. In this manner, the periodic retrieval of management information occurs without any significant participation by the management server host. Moreover, because NIC 310 is able to communicate with the NICs of the targeted systems at a physical level, polling and responses can occur at the lowest level of the network's communication protocol thereby improving the efficiency of the process.

Figure 8A:
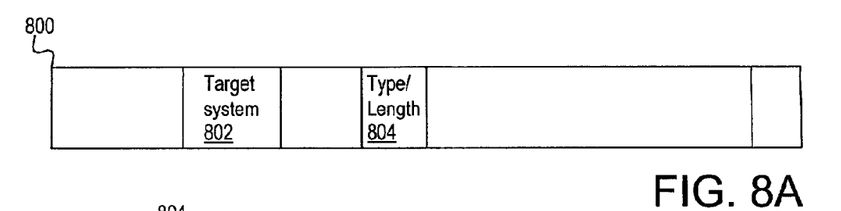
FIGS. 8A and 8B are conceptual representations of an protocol data unit format suitable for use with an embodiment of the invention emphasizing packet prioritization.
Figure 8B:
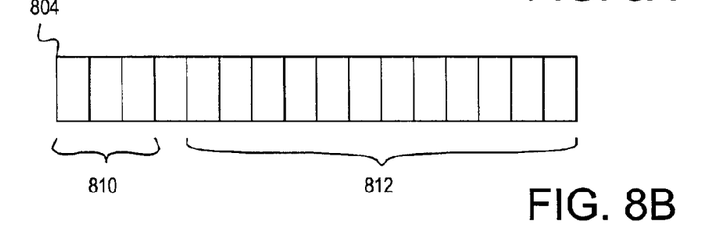
Figure 9:
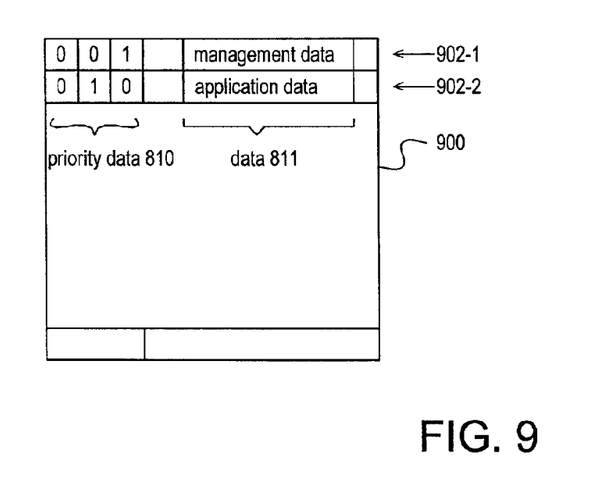
FIG. 9 is a conceptual representation of a buffer suitable for use with the packet prioritization embodiment of the invention.

Turning now to FIGS. 8A, 8B, and 9, an embodiment of the invention emphasizing the ability to re-order or prioritize PDUs is illustrated. Traditionally, enforcement of packet transmission and reception priorities has been difficult even on a single physical subnet. The development of standards with defined priority bits, such as IEEE 802.1 q detailing the Virtual LAN (VLAN) standard, presents the opportunity to implement a priority enhanced network interface card. The priority mechanism can supplement the use of an interrupt coalescence scheme to optimize the manner in which a host processor handles interrupts.

Despite improvements in interrupt handling routines and the advent of long PDUs such as the jumbo PDUs of 1 GBit Ethernet, the host performance penalty associated with generating frequent interrupts is generally unacceptable given the speed at which modern processors are capable of executing. Interrupt coalescence has evolved to reduce the number of interrupts that are issued to a host processor by its NIC. Interrupt coalescence typically includes some form of buffering two or more PDUs and later processing all or at least a portion of the buffered PDUs with a single host processor interrupt. One embodiment of the present invention extends the interrupt coalescence scheme with prioritization to optimize the interrupt techniques.

Referring now to FIG. 8A and 8B, conceptual diagrams illustrating the format of a PDU suitable for implementing the priority handling described herein according to one embodiment of the invention are presented. In the depicted embodiment, a PDU 800 includes a target system field 802, which typically contains the MAC address of a targeted device or devices and a type/length field 804. The type/length field 804 may be suitable for implementing a VLAN network in which multiple logical LAN's may be defined on a single physical medium. In the embodiment further illustrated in FIG. 8B, the type/length field 804 includes a VLAN identifier (VID) field 812 and a priority field 810. In the depicted embodiment, which is compatible with the VLAN implementation specified in IEEE 802.1 q, the VID field 812 includes 12 bits and is capable of specifying as many as 4 K virtual LANs. The priority field 810 may include three bits and is capable of specifying a PDU priority of 0 to 7.

Referring to FIG. 9, a conceptual illustration of a buffer 900 suitable for use with the PDU prioritization scheme described herein is presented. Buffer 900 is a storage device that is typically located on a NIC of a network device. Thus, buffer 900 may comprise all or a portion of the buffer 320 depicted in FIG. 3 or the buffer 220 of a server appliance 101 as depicted in FIG. 6. Buffer 900 is logically divided into a plurality of entries 902 (two of which are identified in FIG. 9 by reference numerals 902-1 and 902-2). Each buffer entry 902 is suitable for storing a PDU that has been received from or is destined for another device on network 100. Each of the PDUs stored in an entry 902 of buffer 900 includes a priority field 810 and a data field 811. In one embodiment of the invention, management PDUs are differentiated from application PDUs by a differentiation in the corresponding entry's priority field 810. As illustrated in FIG. 9, the priority field 810 of a management PDU such as the management PDU depicted in entry 902-1 may be assigned a first value such as 001b while the priority field 810 of an application PDU (entry 902-2) may be assigned a second value such as 010b. By using the priority field provided by the network protocol specification to differentiate between management information and application information, this embodiment of the invention enables the NIC to provide interrupts to the corresponding host selectively depending upon the type of the buffered transaction.

In one embodiment, for example, the NIC 220 of a server appliance 101 may include a table indicating the number of PDUs that may be coalesced before an interrupt is issued to the server appliance's host processor 212. This table may include different values for each priority type such that high priority PDUs may cause relatively more frequent interrupts whereas low priority PDUs cause relatively less frequent interrupts. Thus, for example, NIC 210 of server appliance 101 may generate a host processor interrupt for each application PDU it receives, but only generate a host processor interrupt after it has accumulated multiple management PDUs. In this manner, the number of host processor interrupts is reduced in a manner that accounts for the priority of the corresponding PDUs.

The buffer 900 may represent a buffer of PDUs that are ready to be sent onto the network rather than a buffer of received PDUs. In this embodiment, the priority field data may be used to prioritize the order in which PDUs are transmitted across the network. In this embodiment, the order in which PDUs are stored in buffer 900 does not necessarily indicate the order in which they are forwarded onto the network. Instead, the priority field data may take precedence over the sequential order in which the PDUs are generated. Referring again to an example in which application PDUs receive a higher priority value than management PDUs, application PDUs may be forwarded to the network quickly while management PDUs are permitted to reside in buffer 900 for a longer duration. In this manner, the transmission of management PDUs can be tailored to minimize the bandwidth and performance impact. The management PDUs could, as an example, accumulate in buffer 900 until the corresponding NIC senses a lapse in the number of application packets being transmitted. In at least some applications, a lack of PDU activity during a particular time period is a good predictor that there will be a similar lack of activity during a subsequent time period. When the NIC detects such a lapse, it could make the assumption that there is not likely to be any application PDU information in the immediate future and take the time to forward any pending management PDUs during that period.

It will be apparent to those skilled in the art having the benefit of this disclosure that the present invention contemplates a system and method for implementing larger PDUs in a network to minimize bandwidth consumption and facilitate the transmission of network management PDUs over the same physical network as application and application PDUs. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A data processing network comprising:

a first server including a first network interface card (NIC) that connects the first server to a central switch; the first NIC comprising a buffer; the first server being a management server and managing a second server using management information;

the second server including a second network interface card (NIC) that connects the second server to the central switch;

wherein, the first NIC is configured to store, a first protocol data unit (PDU) received from the second NIC, in the buffer, after the first NIC determining that the first PDU is of a first type consisting of just a single header; wherein, the single header being a media access control (MAC) header; wherein, the first PDU is generated at the data link layer of the network's protocol stack, containing the management information; and wherein, the first NIC is further configured to, detect available unused space, in a second PDU of a second type received from the second NIC and generated at the highest level of the network's protocol stack; and after determining that the first PDU and the second PDU are destined to a common target, the first NIC stores a payload of the first PDU in the available unused space of a payload of the second PDU to form a combined PDU.

2. The network of claim 1, wherein the first type of PDU comprises a management PDU and the second type of PDU comprises an application PDU.

3. The network of claim 1, wherein the first PDU is stored in the buffer upon determining that the size of the PDU is less than a predetermined maximum size and further wherein the payload of the first PDU is stored in the second PDU upon determining that the size of the second PDU is less than the size of the network's maximum transmission unit (MTU).

4. The network of claim 1, wherein the combined PDU the payload of the second PDU and a second header indicative of the size of the entire payload of the combined PDU.

5. The network of claim 1, wherein the first PDU is generated at a data link level of the network's protocol stack such that the first PDU includes only a media access control (MAC) header suitable for communicating between devices that are directly connected to the central switch.

6. The network of claim 5, wherein network protocol stack comprises the TCP/IP protocols and the second PDU comprises an application PDU generated at the highest level of the protocol stack such that the second PDU includes a MAC header, an IP header, and a TCP header.

7. The network of claim 1, wherein the first server comprises a dedicated management server suitable for managing each of server appliance that is physically connected to the central switch.

8. The network of claim 7, wherein the second server comprises one of the at least one server appliances.

9. The network of claim 1, wherein the first NIC includes a processor, a buffer, and a computer readable medium containing:

code means for distinguishing a management PDU type from an application PDU type;

code means for storing a management PDU in the buffer;

code means for determining if an application PDU and the management PDU share a common target;

code means for storing a payload of the management PDU in an unused portion of a payload of the application PDU responsive to determining that they both share a common network target; and code means for forwarding the combined PDU to the network target.

10. The network of claim 9, wherein the code means for storing the management PDU in the buffer includes code means, responsive to identifying a management PDU, for determining if there is an available entry in the buffer.

11. The network of claim 10, further comprising code means, responsive to determining that the buffer includes an available entry, for determining if the management PDU is eligible for combining with a subsequent management PDU.

12. The network of claim 11, wherein the code means for determining the management PDU is an eligible PDU includes code means for comparing the size of the PDU to a pre-determined maximum size.

13. A method of transmitting protocol data units (PDUs) across a data processing network comprising:

first network interface card (NIC) storing a first protocol data unit (PDU) received from the second NIC, in a buffer of the first NIC; wherein, the first server includes the first network interface card (NIC) that connects the first server to a central switch; the first server being a management server and managing a second server using management information; the second server including a second network interface card (NIC) that connects the second server to the central switch;

the first NIC determining that the first PDU is of a first time consisting of just a single header; wherein, the single header being a media access control (MAC) header; wherein, the first PDU is generated at the data link layer of the network's protocol stack, containing the management information;

the first NIC detecting available unused space in a second PDU of a second type received from the second NIC and generated at the highest level of the network's protocol stack; and the first NIC determining that the first PDU and the second PDU are destined to a common target, the first NIC storing a payload of the first PDU in the available unused space of a payload of the second PDU to form a combined PDU.

14. The method of claim 13, wherein storing the first PDU in the buffer includes determining if the buffer includes an available entry.

15. The method of claim 13, wherein storing the first PDU in the buffer includes determining if the buffer exceeds a predetermined size.

16. The method of claim 13, wherein the first PDU comprises a management PDU type and the second PDU type comprises an application PDU.

17. The method of claim 13, wherein combining the first and second PDUs includes appending the management information in the first PDU to the application information in the second PDU.

18. The method of claim 17, wherein combining the first and second PDUs includes modifying a data link layer header of the second PDU to reflect the increased size of the modified PDU.

19. The method of claim 18, wherein the remaining headers of the combined PDU are unchanged from their corresponding headers in the second PDU.

20. The method of claim 18, wherein combining the first and second PDUs includes modifying the media access control header of the second PDU to reflect the increased size of the combined PDU.

21. The method of claim 13, further comprising, upon receiving the PDU from the network and determining that the received PDU comprises a combined PDU, stripping the information associated with the first PDU from the combined PDU and processing the remaining PDU in the same manner as processing a PDU of the second type.

22. A management server suitable for operating in a data processing network, comprising:

the management server including a first network interface card (NIC) that connects the management server to a central switch; the first NIC comprising a buffer; the management server managing a second server using management information;

the second server including a second network interface card (NIC) that connects the second server to the central switch;

wherein, the first NIC is configured to store, a first protocol data unit (PDU) received from the second NIC, in the buffer, after the first NIC determining that the first PDU is of a first type consisting of just a single header; wherein, the single header being a media access control (MAC) header; wherein, the first PDU is generated at the data link layer of the network's protocol stack, containing the management information; and wherein, the first NIC is further configured to, detect available unused spaces, in a second PDU of a second type received from the second NIC and generated at the highest level of the network's protocol stack; and after determining that the first PDU and the second PDU are destined to a common target, the first NIC stores a payload of the first PDU in the available unused space of a payload of the second PDU to form a combined PDU.

23. The server of claim 22, wherein the first type of PDU comprises a management PDU generated at a data link level of the network's protocol stack and the second type of PDU comprises an application PDU generated at the highest level of the protocol stack.

24. The server of claim 23, wherein combining PDUs of the first type and PDUs of the second type includes appending payload information from the first PDU type to the payload information of the second PDU and modifying the data link layer header of the combined PDU to reflect the increased size of the combined payload.

* * * * *

UNITED STATES PATENT AND TRADEMARK OFFICE
CERTIFICATE OF CORRECTION

PATENT NO. : 6,874,036 B2
DATED : March 29, 2005
INVENTOR(S) : Freeman Leigh Rawson III It is certified that error appears in the above-identified patent and that said Letters Patent is hereby corrected as shown below:

Column 13,
Lines 65-67, claim 4 should read as follows:
4. The network of claim 1, wherein the combined PDU includes a first header indicative of the size of the payload of the second PDU and a second header indicative of the size of the entire payload of the combined PDU.

Column 14,
Lines 43-54 claim 13 should read as follows:
13. A method of transmitting protocol data units (PDUs) across a data processing network comprising:
 first network interface card (NIC) storing a first protocol data unit (PDU) received from the second NIC, in a buffer of the first NIC; wherein, the first server includes the first network interface card (NIC) that connects the first server to a central switch; the first server being a management server and managing a second server using management information; the second server including a second network interface card (NIC) that connects the second server to the central switch;

the first NIC determining that the first PDU is of a first type consisting of just a single header; wherein, the single header being a media access control (MAC) header; wherein, the first PDU is generated at the data link layer of the network's protocol stack, containing the management information;

the first NIC detecting available unused space in a second PDU of a second type received from the second NIC and generated at the highest level of the network's protocol stack; and the first NIC determining that the first PDU and the second PDU are destined to a common target, the first NIC storing a payload of the first PDU in the available unused space of a payload of the second PDU to form a combined PDU.

UNITED STATES PATENT AND TRADEMARK OFFICE
CERTIFICATE OF CORRECTION

PATENT NO. : 6,874,036 B2
DATED : March 29, 2005
INVENTOR(S) : Freeman Leigh Rawson III It is certified that error appears in the above-identified patent and that said Letters Patent is hereby corrected as shown below:

<u>Column 15, line 33 – Column 16, line 24,</u>
Claim 22 should read as follows:
22 (currently amended). A management server suitable for operating in a data processing network, comprising:

the management server including a first network interface card (NIC) that connects the management server to a central switch; the first NIC comprising a buffer; the management server managing a second server using management information;

the second server including a second network interface card (NIC) that connects the second server to the central switch;

wherein, the first NIC is configured to store, a first protocol data unit (PDU) received from the second NIC, in the buffer, after the first NIC determining that the first PDU is of a first type consisting of just a single header; wherein, the single header being a media access control (MAC) header; where, the first PDU is generated at the data link layer of the network's protocol stack, containing the management information; and     wherein, the first NIC is further configured to, detect available unused space, in a second PDU of a second type received from the second NIC and generated at the highest level of the network's protocol stack; and after determining that the first PDU and the second PDU are destined to a common target, the first NIC stores a payload of the first PDU in the available unused space of a payload of the second PDU to form a combined PDU.

Signed and Sealed this

Thirty-first Day of May, 2005

JON W. DUDAS
*Director of the United States Patent and Trademark Office*